C. HALTER.
MASH-TUB.

No. 183,843. Patented Oct. 31, 1876.

Witnesses:
T. H. Parsons
J. R. Drake

Christian Halter
Inventor, By
J. R. Drake
atty.

UNITED STATES PATENT OFFICE.

CHRISTIAN HALTER, OF BUFFALO, NEW YORK.

IMPROVEMENT IN MASH-TUBS.

Specification forming part of Letters Patent No. 183,843, dated October 31, 1876; application filed May 8, 1876.

*To all whom it may concern:*

Be it known that I, CHRISTIAN HALTER, of Buffalo, county of Erie, and State of New York, have made certain Improvements in Mash-Tubs for Distilleries, &c., of which the following is a specification:

The object of this invention is to better agitate the corn-meal, rye, or other grain, or malt, in the mash-tub, so as to throw out from the center around the shaft that portion that now, in the ordinary mash-tubs, settles there, and from which no whisky can be made.

The invention consists in providing in the mash-tub a double-acting rake in two parts—a central rake and independent wings, the central rake revolving on a separate hollow shaft, and having a greater speed than the wings or main part of the rake. It further consists in an arrangement of gears, &c., to operate the rakes, all as hereinafter specified.

Figure 1:
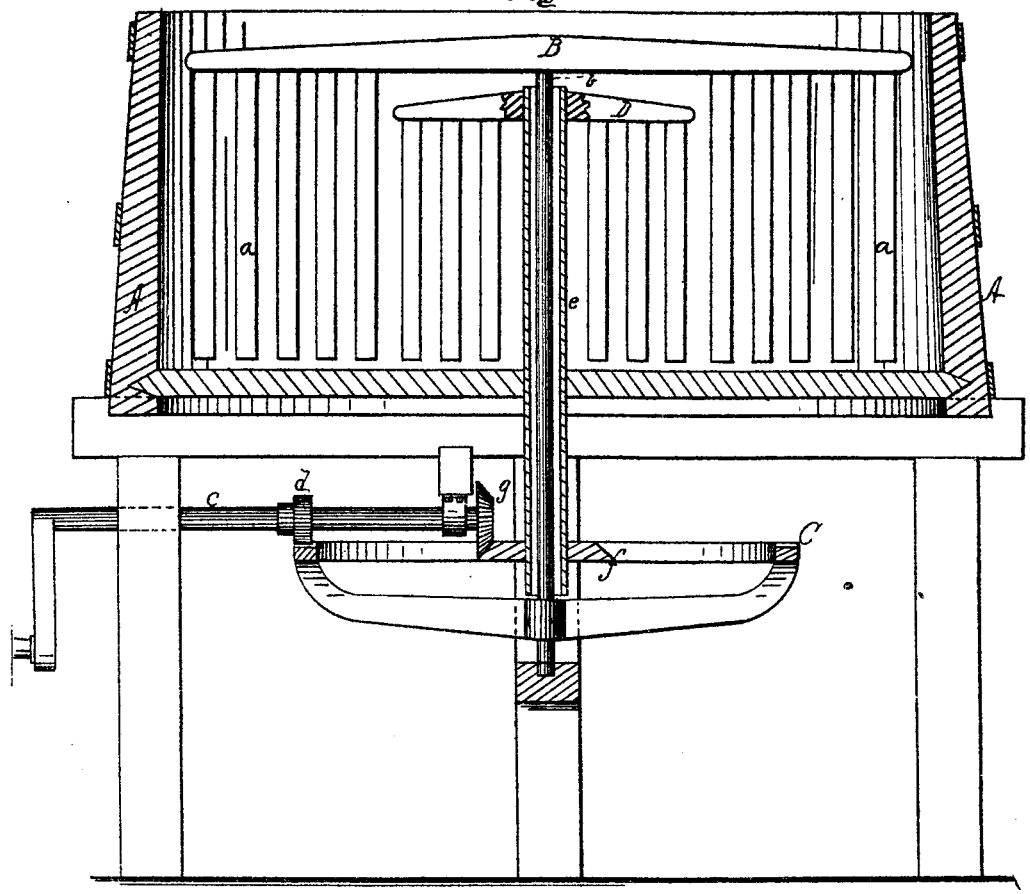
Figure 2:
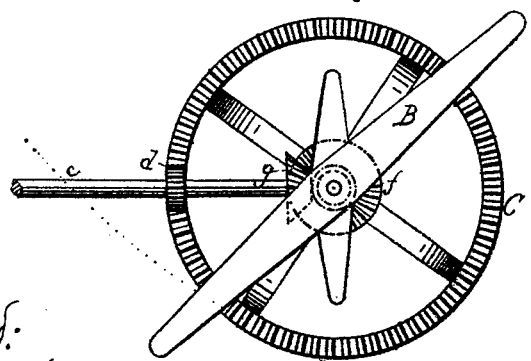

In the drawings, Figure 1 is a vertical cross-section through the tub and operating parts. Fig. 2 is a plan of the operating parts.

A represents a tub, in which the mash is put. B is the main rake, which has two wing cutters or rakes, $a\ a$. This is revolved on a central shaft, $b$, attached to a circular track or frame, C, under the tub, having gear-teeth on its upper edge. A longitudinal shaft, $c$, with a cog, $d$, set thereon, revolves this track and the shaft $b$, which revolves the rakes B $a\ a$. A central rake, D, is attached to a hollow shaft, $e$, which incloses the shaft $b$. Underneath the tub a beveled longitudinal gear-wheel, $f$, surrounds the hollow shaft $e$, and is attached thereto. On the end of the longitudinal shaft $c$ is a beveled gear, $g$. Therefore, when the shaft $c$ is operated it revolves both the shafts $b$ and $e$. The outside or hollow shaft is, of course, revolved much faster than the central shaft $b$. This allows the central rake D to throw out from the center to the circumference all that grain or malt of any kind that is thrown to the center by the main rakes B $a\ a$. This central independent rake D is therefore very important, as the heaviest portion of the stuff is apt to settle there by the action of the ordinary rakes, from which no benefit is derived, while by my improvement the heavy part is thrown out by the central rake, and is mixed with the finer parts of the mash by the outer arms or rakes $a\ a$.

The devices for operating the rakes can be arranged above the mash-tub, if desired.

I claim—

In a mash-tub, the single rake, having an independent central section, both parts working in the same direction, but at different speeds, and operated by suitable mechanism, substantially as specified.

In witness whereof I have hereunto signed my name in the presence of two subscribing witnesses.

CHRISTIAN HALTER.

Witnesses:
   J. R. DRAKE,
   T. H. PARSONS.